(12) United States Patent
Foitzik et al.

(10) Patent No.: US 10,077,037 B2
(45) Date of Patent: Sep. 18, 2018

(54) HYDRAULIC CONTROL UNIT FOR AT LEAST ONE HYDRAULIC UNIT OF A BRAKE SYSTEM AND BRAKE BOOSTER CONTROL UNIT FOR AN ELECTROMECHANICAL BRAKE BOOSTER OF A BRAKE SYSTEM

(71) Applicant: Robert Bosch GmbH, Stuttgart (DE)

(72) Inventors: Bertram Foitzik, Ilsfeld (DE); Patrick Christian Schaefer, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 21 days.

(21) Appl. No.: 15/316,581

(22) PCT Filed: Apr. 7, 2015

(86) PCT No.: PCT/EP2015/057447
§ 371 (c)(1),
(2) Date: Dec. 6, 2016

(87) PCT Pub. No.: WO2015/188957
PCT Pub. Date: Dec. 17, 2015

(65) Prior Publication Data
US 2017/0158182 A1    Jun. 8, 2017

(30) Foreign Application Priority Data
Jun. 10, 2014   (DE) .................. 10 2014 210 998

(51) Int. Cl.
*B60T 13/74*    (2006.01)
*B60T 8/32*    (2006.01)
(Continued)

(52) U.S. Cl.
CPC ............ *B60T 13/745* (2013.01); *B60T 8/321* (2013.01); *B60T 8/44* (2013.01); *B60T 13/20* (2013.01);
(Continued)

(58) Field of Classification Search
CPC ...... B60T 13/745; B60T 15/028; B60T 15/36; B60T 13/20; B60T 2270/402;
(Continued)

(56) References Cited

U.S. PATENT DOCUMENTS 6,189,981 B1 * 2/2001 Niedermeier ........... B60T 7/042
                                                        303/122.04
7,367,187 B2 * 5/2008 Ikeda .................... B60T 13/746
                                                        60/545

(Continued)

FOREIGN PATENT DOCUMENTS

| DE | 19947750 C1 | 1/2001 |
|----|-------------|--------|
| DE | 102009056765 A1 | 6/2011 |
| DE | 102010043203 A1 | 5/2012 |

OTHER PUBLICATIONS

International Search Report dated Nov. 16, 2015 issued in the corresponding International Patent Application PCT/EP2015/057447 filed Apr. 7, 2015.

*Primary Examiner* — Pamela Rodriguez
(74) *Attorney, Agent, or Firm* — Norton Rose Fulbright US LLP; Gerard Messina

(57) ABSTRACT

A hydraulic control device for at least one hydraulic aggregate of a brake system, and a brake booster control device, interacting therewith, for an electromechanical brake booster of the brake system. The hydraulic control device includes a first control electronics by which at least one motor target quantity that is to be realized by a motor of the electromechanical brake booster can be determined, taking into account a provided brake actuating strength quantity
(Continued)

relating to a current actuation of a brake actuating element, and by which a specification signal corresponding to the at least one determined motor target quantity can be outputted to the brake booster control device. The brake booster control device has a second control electronics that, at least in a normal mode, outputs the control signal to the motor of the electromechanical brake booster, taking into account the specification signal outputted by the hydraulic control device.

15 Claims, 1 Drawing Sheet

(51) Int. Cl.
  B60T 8/44 (2006.01)
  B60T 17/22 (2006.01)
  B60T 13/20 (2006.01)
  B60T 15/02 (2006.01)
  B60T 15/36 (2006.01)
  B60T 8/40 (2006.01)

(52) U.S. Cl.
  CPC ............ *B60T 15/028* (2013.01); *B60T 15/36* (2013.01); *B60T 17/221* (2013.01); *B60T 8/4077* (2013.01); *B60T 2201/03* (2013.01); *B60T 2270/402* (2013.01); *B60T 2270/403* (2013.01)

(58) Field of Classification Search
  CPC ...... B60T 2270/403; B60T 8/321; B60T 8/44; B60T 17/221; B60T 8/4077; B60T 2201/03
  USPC .......... 303/3, 122.02, 122.09, 122.12, 115.2, 303/113.3, 114.2, 114.3
  See application file for complete search history.

(56) References Cited

U.S. PATENT DOCUMENTS

| | | | |
|---|---|---|---|
| 7,926,887 B2* | 4/2011 | Ohkubo | B60T 8/4081 303/122.03 |
| 8,348,352 B2* | 1/2013 | Nishino | B60T 7/042 303/115.2 |
| 2009/0261649 A1* | 10/2009 | Higuma | B60T 8/4275 303/113.3 |
| 2011/0120122 A1* | 5/2011 | Cagnac | B60T 7/042 60/579 |
| 2012/0053803 A1 | 3/2012 | Ueno | |
| 2014/0095044 A1 | 4/2014 | Kikawa et al. | |
| 2015/0032352 A1* | 1/2015 | Butz | B60T 7/042 701/70 |

* cited by examiner

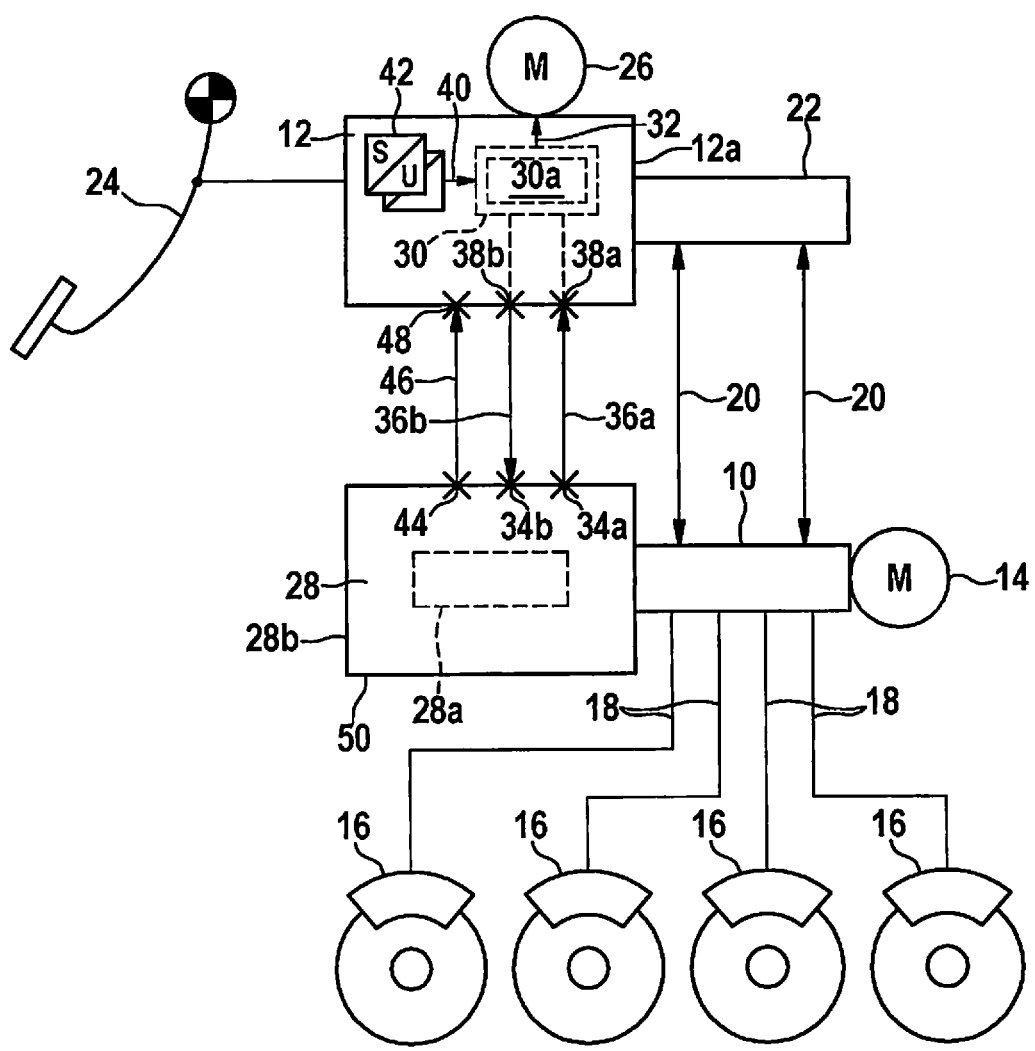

HYDRAULIC CONTROL UNIT FOR AT LEAST ONE HYDRAULIC UNIT OF A BRAKE SYSTEM AND BRAKE BOOSTER CONTROL UNIT FOR AN ELECTROMECHANICAL BRAKE BOOSTER OF A BRAKE SYSTEM

FIELD

The present invention relates to a hydraulic control device for at least one hydraulic aggregate of a brake system, and to a hydraulic aggregate for a brake system. The present invention also relates to a brake booster control device for an electromechanical brake booster of a brake system, and to an electromechanical brake booster for a brake system. In addition, the present invention relates to a brake system for a vehicle.

BACKGROUND INFORMATION

In German Patent Application No. DE 10 2010 043 203 A1, a brake booster and a method for operating a brake booster are described. As is shown in the FIGURES, the brake booster is fashioned as an electromechanical brake booster. To control the electromechanical brake booster, a brake booster control device can be used. The brake booster control device can in addition interact with a hydraulic control device for at least one hydraulic aggregate of a brake system.

SUMMARY

The present invention provides a hydraulic control device for at least one hydraulic aggregate of a brake system, a hydraulic aggregate for a brake system, a brake booster control device for an electromechanical brake booster of a brake system, an electromechanical brake booster for a brake system, and a brake system for a vehicle.

The present invention provides an advantageous functional separation between the hydraulic control device and the brake booster control device interacting therewith. In particular, the present invention provides a master-slave design for the interaction of the hydraulic control device and the brake booster control device, the hydraulic control device taking on the master status and the brake booster control device taking on the slave status. The brake booster control device operated in slave status can thus adapt its functioning so quickly to the current actuation of the brake actuating element by a driver of the vehicle equipped with the respective brake system, and to the current operation of the hydraulic control device in the master status, that for the driver a pleasant brake actuation feel (pedal feel) is ensured. In particular, even during blending processes (executed as a rule by the hydraulic control device), it is ensured that the driver does not notice anything of a currently executed blending process when actuating the brake actuating element. The present invention thus also contributes to improvement of braking comfort for the driver.

In an advantageous specific embodiment, the hydraulic control device has at least one data line terminal to which a data line can be connected or is connected in such a way that the hydraulic control device can be connected or is connected to the brake booster control device via the at least one data line. Correspondingly, the brake booster control device can also have at least one second data line terminal to which the at least one data line can be connected or is connected in such a way that the brake booster control device can be connected or is connected to the hydraulic control device via the at least one data line. The connection according to the present invention of the hydraulic control device to the brake booster control device via the at least one data line is as a rule faster than a conventional connection of the two control devices to a CAN, $I^2C$, or Flexray data bus. Thus, the present invention provides a significantly faster communication between the hydraulic control device and the brake booster control device.

Preferably, the brake booster control device is designed to provide the at least one brake actuation strength quantity to the hydraulic control device via the at least one data line, taking into account at least one sensor signal of at least one brake actuation sensor. For example, the data of the at least one brake actuation sensor can also be sent to the hydraulic control device by SPI or USB. This is significantly faster than a conventional data transmission from the at least one brake actuation sensor to the hydraulic control device via a CAN, $I^2C$, or Flexray data bus.

In a further advantageous specific embodiment, the hydraulic control device has a first clock synchronization line terminal to which a clock synchronization line can be connected or is connected in such a way that the hydraulic control device can be connected or is connected to the brake booster control device via the clock synchronization line. Correspondingly, the brake booster control device can also have a second clock synchronization line terminal to which the clock synchronization line can be connected or is connected in such a way that the brake booster control device can be connected or is connected to the hydraulic control device via the clock synchronization line. In this case, a time synchronization between the two control devices can also be carried out.

In a preferred specific embodiment, the brake booster control device can be synchronized to the hydraulic control device. This enables the master-slave design covering the two control devices.

In an advantageous development, the first control electronics is in addition designed to control the at least one valve and/or the at least one pump motor in order to execute a brake boosting when there is an impairment of functioning and/or a functional failure of the brake booster control device and/or of the electromechanical brake booster. Thus, the hydraulic control device, the at least one valve, and/or the at least one pump motor can support the driver in terms of force while building up a brake pressure in at least one wheel brake cylinder of the brake system. Thus, despite the functional impairment/functional failure of the brake booster control device and/or of the electromechanical brake booster, the driver is still provided with a pleasant brake actuation feel (pedal feel).

As an alternative, or in addition, in the case of a functional impairment and/or a functional failure of the hydraulic control device the second control electronics can be made to transition from the normal mode to a bypass mode, the second control electronics being designed, in the bypass mode, to itself determine the at least one motor target quantity, taking into account at least the at least one brake actuating strength quantity and/or the at least one sensor signal. The brake boost can thus also be maintained solely using the brake booster control device. The software required for this can be contained in the brake booster control device without (significant) increase of a constructive space requirement for the second control electronics. The software can be activated by transitioning the brake booster control device into the bypass mode.

The advantages described above of the hydraulic control device are also ensured in a hydraulic aggregate for a brake system having a corresponding hydraulic control device.

The advantages described above of the brake booster control device can also be realized by an electromechanical brake booster for a brake system having such a brake booster control device.

In a preferred specific embodiment of the electromechanical brake booster, the brake booster control device is installed in a cover of the motor of the electromechanical brake booster. The brake booster control device can thus easily be integrated in the electromechanical brake booster in a space-saving manner.

In addition, a brake system for a vehicle having at least a corresponding hydraulic control device and such a brake booster control device also provides the advantages explained above.

For example, the hydraulic control device or the hydraulic aggregate equipped therewith can have at least one first housing in and/or on which at least the first control electronics is integrated, the brake booster control device or the electromechanical brake booster equipped therewith having at least one second housing in and/or on which at least the second control electronics is integrated. The hydraulic control device and the brake booster control device interacting therewith can thus be realized as two separately fashioned components of the brake system.

BRIEF DESCRIPTION OF THE DRAWINGS

Further features and advantages of the present invention are explained below on the basis of FIG. 1, which shows a schematic representation of specific embodiments of the hydraulic control device and of the brake booster control device.

FIG. 1 shows schematic representations of specific embodiments of the hydraulic control device and of the brake booster control device.

DETAILED DESCRIPTION OF EXAMPLE EMBODIMENTS

The brake system shown schematically in FIG. 1 can be used in a vehicle/motor vehicle, such as an electric or hybrid vehicle. The usability of the brake system is not limited to a particular vehicle type.

The brake system is equipped with at least one hydraulic aggregate 10 and with an electromechanical brake booster 12. Hydraulic aggregate 10 can also be understood as a hydraulic block, an ABS (anti-lock braking) system, and/or an ESP system (system for driving dynamics regulation/electronic stability program). Hydraulic aggregate 10 can be equipped with at least one valve (not shown) and/or with at least one pump motor 14 of at least one pump. Merely as an example, the brake system of FIG. 1 has four wheel brake cylinders 16 that are connected to hydraulic aggregate 10 (via hydraulic lines 18). Moreover, hydraulic aggregate 10 is connected (via further hydraulic lines 20) to a master brake cylinder 22 of the brake system. As is indicated in the (merely schematic) representation of components 16 through 22, hydraulic aggregate 10 is not to be understood as a particular type of hydraulic aggregate. Instead, the brake system can be equipped with a multiplicity of different exemplary embodiments of hydraulic aggregate 10.

Electromechanical brake booster 12, situated for example between a brake actuating element 24, such as a brake pedal 24, and master brake 22, is also not to be understood as any particular brake booster type. Instead, any brake booster type equipped with an (electric) motor 26 can be used as electromechanical brake booster 12.

The brake system of FIG. 1 moreover has at least one hydraulic control device 28 and a brake booster control device 30. Hydraulic control device 28 includes a first control electronics 28a by which at least one valve control signal (not shown) can be outputted to the at least one valve of hydraulic aggregate 10 and/or of the brake system, and/or at least one pump motor control signal (not shown) can be outputted to the at least one pump motor 14 of the at least one pump of hydraulic aggregate 10 and/or of the brake system.

For example, hydraulic control device 28 can be designed to control the at least one valve and/or the at least one pump motor 14 in such a way that an automatic locking prevention (ABS function) and/or a driving dynamics regulation/electronic stability program (ESP/ESC, or electronic stability control) can be carried out. Alternatively or in addition, the at least one valve and/or the at least one pump motor 14 can also be capable of being controlled by hydraulic control device 28 in such a way that through a transfer of brake fluid, the at least one brake pressure present in the wheel brake cylinders 16 can be increased or reduced in such a way that a generator braking torque of a generator (not shown), varying over time and brought about simultaneously for the recuperative braking of the vehicle, can be blended.

Moreover, first control electronics 28a is designed to determine at least one motor target quantity that is to be realized by motor 26 of electromechanical brake booster 12. The determining of the at least one motor target quantity that is to be realized takes place taking into account at least one provided brake actuation strength quantity relating to a brake actuation strength of a current actuation (by a driver) of brake actuating element 24 connected to the brake system. The at least one motor target quantity determined by first control electronics 28a can for example be a motor current that is to be provided to motor 26 of electromechanical brake booster 12, a motor voltage that is to be applied to motor 26 of electromechanical brake booster 12, a motor target angle of rotation, a target angular speed of motor 26, a target rotational speed of motor 26, and/or a target mode (to be realized) of motor 26 of electromechanical brake booster 12. Moreover, first control electronics 28a is designed to output a specification signal corresponding to the at least one determined motor target quantity to brake booster control device 30 of electromechanical brake booster 12.

Brake booster control device 30 is fashioned for interaction with hydraulics control device 28. Brake booster control device 30 has a second control electronics 30a by which at least one control signal 32 can be outputted to motor 26 of the electromechanical brake booster. Second control electronics 30a is designed such that, at least in a normal mode, second control electronics 30a outputs control signal 32 to motor 26 of electromechanical brake booster 12 taking into account the specification signal outputted by hydraulic control device 28. The (electric) motor controlled by control signal 32 in this case realizes at least one motor actual quantity that corresponds to the at least one determined (by hydraulic control device 28) motor target quantity. Motor 26 of electromechanical brake booster 12 is therefore capable of being controlled (via brake booster control device 30) by first control electronics 28 of hydraulic control device 28 in such a way that the manner of operation/manner of functioning of motor 26 can be specified by first control electronics 28. The controlling/regulation of the brake boosting carried out by motor 26 can thus be carried out by hydraulic control device 28 (preferably in addition to the "classical" ABS functions, ESP functions, and/or blending functions).

In contrast, second control electronics 30a of brake booster control device 30 carries out, at least in its normal mode, only one controlling/regulation, subordinate to first control electronics 28a, of motor 26 of electromechanical brake booster 12. The controlling/regulation, subordinate to first control electronics 28a, of motor 26 can for example include/be a fine setting/fine regulation, monitoring, and/or correction of the motor current, motor voltage, motor torque, rotational speed and/or angle of rotation of motor 26.

The advantageous realization of control devices 28 and 30 provides a master-slave design, where hydraulic control device 28 is the master control device and brake booster control device 30 is the slave control device. To realize the advantageous master-slave design between control devices 28 and 30, first control electronics 28a of hydraulic control device 28 is equipped only with a functional software that is necessary for the controlling/regulation of the brake boosting that is to be carried out by electromechanical brake booster 12. (However, a different hierarchy of control devices 28 and 30 is also possible in which the two control devices 28 and 30 are connected as slave control devices to a different master control device (e.g. an ECU).)

Using the advantageous master-slave design, the functioning of the two control devices 28 and 30 can be optimized with regard to their common interaction. In particular, the functioning of (electric) motor 26 of a electromechanical brake booster 12 can automatically be adapted to the current operation of the at least one valve and/or the at least one pump motor 14 of hydraulic aggregate 10/the brake system in such a way that the at least one pump motor 14 does not convey opposite motor 26 of electromechanical brake booster 12. In this way as well, it is possible to prevent a controlling of motor 26 of electromechanical brake booster 12 in order to carry out a (highly dynamic) buildup of brake pressure in wheel brake cylinders 16 during a closing of at least one valve/inlet valve connected to the wheel brake cylinders 16 (due to a sudden decrease in a roadway friction value). Instead, motor 26, (co-)controlled by hydraulic control device 28, of electromechanical brake booster 12, can be used in such a way that its functioning is adapted to all processes that may be controlled by hydraulic control device 28. Specifically, the functioning of motor 26 of electromechanical brake booster 12 can also be adapted to a volume blending (carried out by the at least one valve and/or the at least one pump motor 14) (for adaptation of the brake pressures present in wheel brake cylinders 16 to a temporally varying generator braking torque for recuperative braking of the vehicle).

Using the advantageous master-slave design, a gentle operation of motor 26 of electromechanical brake booster 12 is therefore also possible. Moreover, the advantageous adaptation of the functioning of motor 26 of electromechanical brake booster 12 to the processes controlled by hydraulic control device 28 provides a pleasant brake actuation feel (pedal feel) for the driver actuating brake actuating element 24. Specifically, an adaptation of the brake actuation feel (pedal feel) to currently executed blending processes, longitudinal dynamic regulation processes, and/or transverse dynamic regulation processes is already possible through first control electronics 28a of hydraulic control device 28.

Here, a partitioning of the functions of the two control devices 28 and 30 is realized that does not require working out of new communication designs during operation of the two control devices 28 and 30. Due to the clear separation of the functions of control devices 28 and 30, electromechanical brake booster 12 does not have to be applied. Thus, brake booster control device 30 can be made simpler without having to accept functional impairments of electromechanical brake force booster 12. The production costs of brake force booster control device 30 are therefore capable of being reduced while maintaining braking comfort for the driver.

In addition, a controlling/regulation of the valves by first control electronics 28a of hydraulic control device 28 can be matched to the controlling/regulation of motor 26 of electromechanical brake booster 12. For example, in the case of ABS the inlet valves can be not immediately completely closed in order to attenuate extreme pressure peaks due to the rotor inertia of rotating motor 26 of electromechanical brake booster 12. This ensures better protection of components and a higher degree of energy efficiency.

In order to ensure a small constructive space requirement of the brake system equipped with control devices 28 and 30, hydraulic control device 28 can be integrated in hydraulic aggregate 10. As an alternative or in addition thereto, brake booster control device 30 can be integrated on/in motor 26 of electromechanical brake booster 12, or on and/or in electromechanical brake booster 12. For example, brake booster control device 30 can be installed in a cover of motor 26 of electromechanical brake booster 12.

It is to be noted that a realization of the two control devices 28 and 30 is preferred in which the two control devices 28 and 30 are indeed situated close to one another but are present as separate components, or as sub-units of separate components. Hydraulics control device 28, or hydraulic aggregate 10 equipped therewith, can have at least one first housing 28b. First control electronics 28a of hydraulic control device 28 is preferably integrated in and/or on first housing 28b, while brake booster control device 30, or electromechanical brake booster 12 equipped therewith, have at least one (other) second housing 12a. (Second control electronics 30a is thus integrated in and/or on second housing 12a.) First housing 28b can for example be a housing 28b of hydraulic control device 28 or of hydraulic aggregate 10. In the brake system of FIG. 1, brake booster control device 30 is integrated (together with second control electronics 30a) in housing 12a of electromechanical brake booster 12 (as second housing 12a). As an alternative, brake booster control device 30 can however also have a separate housing (as second housing 12a).

Preferably, hydraulic control device 28 (or first housing 28b) has at least one first data line terminal 34a and 34b to which at least one data line 36a and 36b can be connected or is connected. If warranted, brake booster control device 30 (or second housing 12a) can also have at least one second data line terminal 38a and 38b to which the at least one data line 36a and 36b can be connected or is connected. Hydraulic control device 28 is thus capable of being connected/is connected to brake booster control device 30 via the at least one data line 36a and 36b. Preferably, the at least one data line 36a and 36b is to be understood as at least one line exclusively connecting the two control devices 28 and 30 to one another. Instead of a conventional connection of the two control devices 28 and 30 to a CAN, I²C, or Flexray data bus, in the specific embodiment of FIG. 1 hydraulic control device 28 and brake booster control device 30 has a "private" connection realized by the at least one data line 36a and 36b. Thus, the system formed from the two control devices 28 and 30 appears externally as an integrated system.

The at least one data line 36a and 36b can in particular be an SPI (serial peripheral interface) line 36a and 36b. In this way, a "private" SPI connection/SPI interface can be formed between the two control devices 28 and 30. A transmission speed of an SPI connection/SPI interface created by the at least one SPI line 36a and 36b is significantly greater than a corresponding transmission speed of a CAN, I²C, or Flexray data bus. As an alternative to an SPI connection/SPI interface realized by the at least one SPI line 36a and 36b, a USB connection/USB interface between the two control devices 28 and 30 via at least one USB line/USB cable is also possible. In both cases, a much faster communication is ensured between control devices 28 and 30 than in the case of a conventional data bus connection.

Preferably, the two control devices 28 and 30 can be connected/are connected to one another via a first data line 36a and via a second data line 36b. In this way, a fast bidirectional exchange of data can be realized between the two control devices 28 and 30. For example, the at least one motor target quantity determined by first control electronics 28a can be outputted to second control electronics 30a via first data line 36a. Additional data can also be forwarded from first control electronics 28a to second control electronics 30a via first data line 36a.

In addition, a realization of brake booster control device 30 is preferred in which brake booster control device 30 is designed to provide the at least one brake actuation strength quantity to hydraulic control device 28 via the at least one data line 36a and 36b, in particular via second data line 36b, taking into account at least one sensor signal 40 of at least one brake actuation sensor 42. Via second data line 36b, it is also possible for measurement data, such as motor measurement data of motor 26 of electromechanical brake booster 12, and messages from second control electronics 30a to hydraulic control device 28, to be outputted to hydraulic control device 28.

The at least one brake actuation sensor 42 can for example be a brake path sensor (pedal path sensor, rod path sensor), a difference path sensor, a driver braking force sensor, and/or a driver braking pressure sensor. The at least one brake actuation sensor 42 can easily be integrated into electromechanical brake booster 12, while at the same time the provision of the at least one brake actuation strength quantity to hydraulic control device 28 remains ensured.

In a further advantageous specific embodiment, hydraulic control device 28 (or first housing 28b) has a first clock synchronization line terminal 44 to which a clock synchronization line 46 can be connected or is connected. Correspondingly, brake booster control device 30 (or second housing 12a) can also have a second clock synchronization line terminal 48 to which clock synchronization line 46 can be connected or is connected. In this case, hydraulic control device 28 can be connected/is connected to brake booster control device 30 via clock synchronization line 46. Specifically, brake booster control device 30 can be synchronized/is synchronized to hydraulic control device 28. Above all, via clock synchronization line 46 a time synchronization (GTM, or generic timer model) of the two control devices 28 and 30 can be realized.

Moreover, a vehicle bus terminal 50 can be fashioned on hydraulic control device 28 (or on first housing 28b) so that an exchange of data can be carried out between a vehicle data bus (not shown) connected to vehicle bus terminal 50 and hydraulic control device 28. In contrast, a realization of brake booster control device 30 (or of second housing 12a of brake booster control device 30/electromechanical brake booster 12) not having a vehicle bus terminal is preferred. In this case, of the two control devices 28 and 30 only hydraulic control device 28 is used to send and receive data via the vehicle data bus. Each (bidirectional) exchange of data between the two control devices 28 and 30 and other vehicle components thus takes place via hydraulic control device 28. The system made up of the two control devices 28 and 30 thus communicates with the other vehicle components as an integrated system.

If the two control devices 28 and 30 are present in functioning form, an actuation of brake actuating element 24 by the driver brings it about that the at least one brake actuating strength quantity is outputted by brake booster control device 30 to the first control electronics 28a of hydraulic control device 28 via the at least one data line 36a and 36b (preferably via SPI/via USB). In hydraulic control device 28, through first control electronics 28a the actual interpretation of the driver's desired braking and the ascertaining of the at least one motor target quantity of motor 26 of electromechanical brake booster 12, which ensures a reliable maintaining of the driver's desired braking, takes place. For example, a standard difference path regulation (according to the conventional regulation design of electromechanical brake booster 12) can be carried out by first control electronics 28a.

The specification signal corresponding to the at least one determined motor target quantity can subsequently be outputted by hydraulic control device 28 to second control electronics 30a of brake booster control device 30 via the at least one data line 36a and 36b preferably via SPI/via USB). Thus, in brake booster control device 30, second control electronics 30a carries out/calculates only a motor regulation/motor commutation adapted to the at least one determined motor target quantity. This can take place for example in accordance with a "classical" multi-loop regulator design using current regulators, rotational speed regulators, and/or rotational angle regulators. Meanwhile, motor measurement values acquired at motor 26 of electromechanical brake booster 12 can be outputted to hydraulic control device 28 by brake booster control device 30 via the at least one data line 36a and 36b (preferably via SPI/via USB). First control electronics 28a of hydraulic control device 28 can be designed to take into account the outputted motor measurement values when there is a new determination of the at least one motor target quantity.

In an advantageous development, hydraulic control device 28 has a first control electronics 28a that is in addition designed to control the at least one valve and/or the at least one pump motor 14 of hydraulic aggregate 10 and/or of the brake system in order to carry out a brake boosting when there is a functional impairment and/or a functional failure of brake booster control device 30 and/or of electromechanical brake booster 12. The at least one valve and/or the at least one pump motor 14 can thus take over the brake boosting in such a way that despite the functional impairment/functional failure of brake booster control device 30/electromechanical brake booster 12, the driver can still bring about a sufficient brake pressure in the at least one wheel brake cylinder 16 with a comparatively small driver's braking force. Specifically, a pump run-up of the at least one pump motor 16 can be used to support the pressure buildup in the at least one wheel brake cylinder 16. The brake boosting controlled by hydraulic control device 28 can take into account at least one value of at least one pressure sensor of hydraulic aggregate 10/the brake system.

In an alternative or supplementary development, second control electronics 30a of brake booster control device 30 can be transitioned from the normal mode described above to a bypass mode in the case of a functional impairment and/or functional failure of hydraulic control device 28.

Preferably, second control electronics 30a is designed, in the bypass mode, to itself determine the at least one motor target quantity, taking into account at least the brake actuation strength quantity and/or the at least one sensor signal 40 of the at least one brake actuation sensor 42. While, given a presence of second control electronics 30a in its normal mode (with full functional capacity of hydraulic control device 28), the function software for the brake boosting is calculated only by first control electronics 28a, in this case second control electronics 30a, transitioned into the bypass mode, can itself calculate the functional software for the brake boosting. Second control electronics 30a transitioned to the bypass mode can therefore bypass the functional impairment/functional failure of hydraulic control device 28 using the backup function that it can execute. The brake boosting can thus (at least transitionally) also be maintained with brake booster control device 30 alone.

The advantageous embodiment described in the preceding paragraph of second control electronics 30a requires only an integration of the software required to determine the at least one motor target quantity into second control electronics 30a. The required software state is a basic state having the function of brake boosting, requiring no vehicle-specific adaptation. Thus, the required software can easily be stored in second control electronics 30 even without increasing a constructive space requirement of this electronics. After a functional failure of hydraulic control device 28, a communication of the two control devices 28a and 30 with the further vehicle components can be limited to reading and sending status information.

Moreover, the system ASIC in brake booster control device 30 can be replaced by an ABS. In this case, the inlet and outlet valves in the ESP can be controlled in such a way that a pumpless ABS is also possible.

What is claimed is:

1. A hydraulic control device for at least one hydraulic aggregate of a brake system, comprising:
    a first control electronics by which at least one of: i) at least one valve control signal can be outputted to at least one valve of the hydraulic aggregate and/or of the brake system, and ii) at least one pump motor control signal can be outputted to at least one pump motor of at least one pump of the hydraulic aggregate and/or of the brake system;
    wherein the first control electronics is designed to determine at least one motor target quantity to be realized by a motor of an electromechanical brake booster of the brake system, taking into account at least one provided brake actuation strength quantity relating to a brake actuation strength of a current actuation of a brake actuating element connected to the brake system, and to output a specification signal corresponding to the at least one determined motor target quantity to a brake booster control device of the electromechanical brake booster, the brake booster control device to control the motor based on the specification signal from the first control electronics;
    wherein the hydraulic control device is a separate device relative to the brake booster control device, the hydraulic control device being a master control device, the brake booster control device being a slave control device and being a slave to the hydraulic control device.

2. The hydraulic control device as recited in claim 1, wherein the hydraulic control device has at least one first data line terminal to which at least one data line can be connected or is connected in such a way that the hydraulic control device can be connected or is connected to the brake booster control device via the at least one data line.

3. The hydraulic control device as recited in claim 1, wherein the hydraulic control device has a first clock synchronization line terminal to which a clock synchronization line can be connected or is connected in such a way that the hydraulic control device can be connected or is connected to the brake booster control device via the clock synchronization line.

4. The hydraulic control device as recited in claim 1, wherein the first control electronics is designed to control at least one of the at least one valve and the at least one pump motor, to execute a brake boosting when there is a functional impairment and/or a functional failure of the brake booster control device and/or of the electromechanical brake booster.

5. A hydraulic aggregate for a brake system, comprising:
    a hydraulic control device for the at least one hydraulic aggregate the brake system, comprising:
        a first control electronics by which at least one of: i) at least one valve control signal can be outputted to at least one valve of the hydraulic aggregate and/or of the brake system, and ii) at least one pump motor control signal can be outputted to at least one pump motor of at least one pump of the hydraulic aggregate and/or of the brake system;
        wherein the first control electronics is designed to determine at least one motor target quantity to be realized by a motor of an electromechanical brake booster of the brake system, taking into account at least one provided brake actuation strength quantity relating to a brake actuation strength of a current actuation of a brake actuating element connected to the brake system, and to output a specification signal corresponding to the at least one determined motor target quantity to a brake booster control device of the electromechanical brake booster, the brake booster control device to control the motor based on the specification signal from the first control electronics;
        wherein the hydraulic control device is a separate device relative to the brake booster control device, the hydraulic control device being a master control device, the brake booster control device being a slave control device and being a slave to the hydraulic control device.

6. A brake booster control device for an electromechanical brake booster of a brake system for interaction with a hydraulic control device for at least one hydraulic aggregate of a brake system, the hydraulic control device including a first control electronics by which at least one of: i) at least one valve control signal can be outputted to at least one valve of the hydraulic aggregate and/or of the brake system, and ii) at least one pump motor control signal can be outputted to at least one pump motor of at least one pump of the hydraulic aggregate and/or of the brake system, wherein the first control electronics is designed to determine at least one motor target quantity to be realized by a motor of the electromechanical brake booster of the brake system, taking into account at least one provided brake actuation strength quantity relating to a brake actuation strength of a current actuation of a brake actuating element connected to the brake system, and to output a specification signal corresponding to the at least one determined motor target quantity to the brake booster control device of the electromechanical brake booster, the brake booster control device comprising:

a second control electronics by which at least one control signal can be outputted to the motor of the electromechanical brake booster;

wherein the second control electronics is designed such that, at least in a normal mode, the second control electronics outputs the control signal to the motor of the electromechanical brake booster, taking into account the specification signal outputted by the hydraulic control device, so that the motor controlled by the control signal realizes at least one motor actual quantity that corresponds to the at least one determined motor target quantity.

7. The brake booster control device as recited in claim 6, wherein the brake booster control device has at least one second data line terminal to which at least one data line can be connected or is connected in such a way that the brake booster control device can be connected or is connected to the hydraulic control device via the at least one data line.

8. The brake booster control device as recited in claim 7, wherein the brake booster control device is designed to provide the at least one brake actuating strength quantity to the hydraulic control device via the at least one data line taking into account at least one sensor signal of at least one brake actuation sensor.

9. The brake booster control device as recited in claim 6, wherein the brake booster control device has a second clock synchronization line terminal to which a clock synchronization line can be connected or is connected in such a way that the brake booster control device can be connected or is connected to the hydraulic control device via the clock synchronization line.

10. The brake booster control device as recited in claim 6, wherein the brake booster control device is capable of being synchronized to the hydraulic control device.

11. The brake booster control device as recited in claim 6, wherein the second control electronics is capable of being transitioned from the normal mode to a bypass mode when there is at least one of a functional impairment and a functional failure of the hydraulic control device, and the second control electronics is designed to, in the bypass mode, itself determine the at least one motor target quantity, taking into account at least the at least one brake actuation strength quantity and/or the at least one sensor signal.

12. An electromechanical brake booster for a brake system, having a brake booster control device the electromechanical brake booster of the brake system for interaction with a hydraulic control device for at least one hydraulic aggregate of a brake system, the hydraulic control device including a first control electronics by which at least one of: i) at least one valve control signal can be outputted to at least one valve of the hydraulic aggregate and/or of the brake system, and ii) at least one pump motor control signal can be outputted to at least one pump motor of at least one pump of the hydraulic aggregate and/or of the brake system, wherein the first control electronics is designed to determine at least one motor target quantity to be realized by a motor of the electromechanical brake booster of the brake system, taking into account at least one provided brake actuation strength quantity relating to a brake actuation strength of a current actuation of a brake actuating element connected to the brake system, and to output a specification signal corresponding to the at least one determined motor target quantity to the brake booster control device of the electromechanical brake booster, the brake booster control device comprising:

a second control electronics by which at least one control signal can be outputted to the motor of the electromechanical brake booster;

wherein the second control electronics is designed such that, at least in a normal mode, the second control electronics outputs the control signal to the motor of the electromechanical brake booster, taking into account the specification signal outputted by the hydraulic control device, so that the motor controlled by the control signal realizes at least one motor actual quantity that corresponds to the at least one determined motor target quantity.

13. An electromechanical brake booster as recited in claim 12, wherein the brake booster control device is installed in a cover of the motor of the electromechanical brake booster.

14. A brake system for a vehicle, comprising:

a hydraulic control device for at least one hydraulic aggregate of the brake system, including a first control electronics by which at least one of: i) at least one valve control signal can be outputted to at least one valve of the hydraulic aggregate and/or of the brake system, and ii) at least one pump motor control signal can be outputted to at least one pump motor of at least one pump of the hydraulic aggregate and/or of the brake system, wherein the first control electronics is designed to determine at least one motor target quantity to be realized by a motor of an electromechanical brake booster of the brake system, taking into account at least one provided brake actuation strength quantity relating to a brake actuation strength of a current actuation of a brake actuating element connected to the brake system, and to output a specification signal corresponding to the at least one determined motor target quantity to the brake booster control device of the electromechanical brake booster; and a brake booster control device, including a second control electronics by which at least one control signal can be outputted to the motor of the electromechanical brake booster, wherein the second control electronics is designed such that, at least in a normal mode, the second control electronics outputs the control signal to the motor of the electromechanical brake booster, taking into account the specification signal outputted by the hydraulic control device, so that the motor controlled by the control signal realizes at least one motor actual quantity that corresponds to the at least one determined motor target quantity.

15. The brake system as recited in claim 14, wherein the hydraulic control device has at least one first housing in and/or on which at least the first control electronics is integrated, and at least one second housing in and/or on which at least the second control electronics is integrated.

* * * * *